Figure 1:
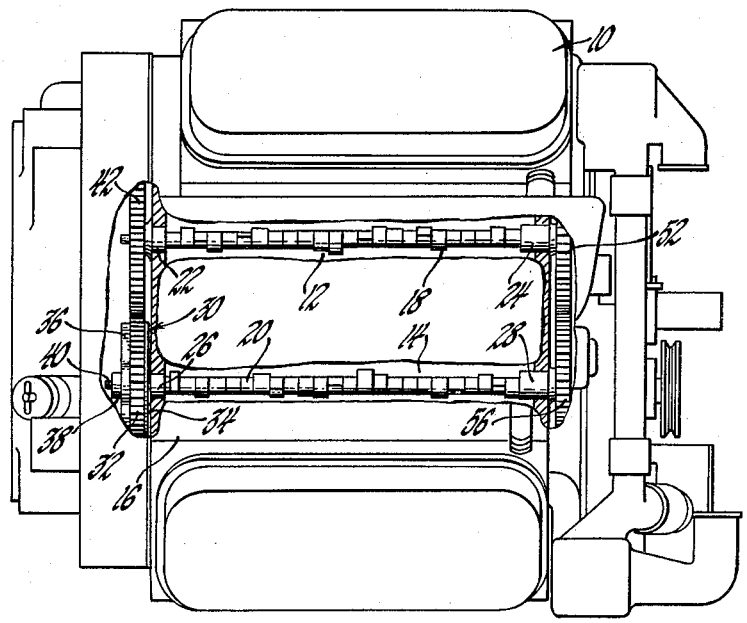

Oct. 8, 1963  G. P. HANLEY  3,106,195
ENGINE TIMING AND BALANCING MECHANISM
Filed Jan. 9, 1962

INVENTOR.
George P. Hanley
BY
E. E. James
ATTORNEY

United States Patent Office
3,106,195
Patented Oct. 8, 1963

3,106,195
ENGINE TIMING AND BALANCING MECHANISM
George P. Hanley, Northville, Mich., assignor to General Motors Corporation, Detroit, Mich., a corporation of Delaware
Filed Jan. 9, 1962, Ser. No. 165,186
5 Claims. (Cl. 123—90)

This invention relates generally to an internal combustion engine and particularly contemplates mechanism operable to modify the operative cyclic timing of an internal combustion engine and thus effect alternative and modulated power output or energy absorbing characteristics thereof without disturbing the phased relationship of associated engine balancing means.

The instant invention is an improvement of the engine timing mechanism shown and described in copending United States patent application Serial No. 94,887, entitled "Phase Adjusting Servo Mechanism for Internal Combustion Engine and the Like," filed March 10, 1961, in the names of Ralph R. Bekkala and Harvey G. Humphries. The mechanism of the invention thus has particular application in varying the camshaft timing of exhaust valve operation in two-cycle uniflow scavenged internal combustion engines generally of the type shown and described in United States Patent No. 2,179,709 to A. F. Brecht, entitled "Internal Combustion Engine"; in copending United States patent application S.N. 1,488, entitled "Internal Combustion Engine," filed January 11, 1960, in the names of Harold H. Albinson et al.; and in copending United States patent application S.N. 34,728, filed June 8, 1960, in the names of George W. Conover et al. Such engines are characterized by use of overhead unit fuel injectors and uniflow scavenged exhaust valves sequentially operated by counterrotating cam and balance shafts which are synchronously driven in phased relation to the engine crankshaft and have eccentric balancing masses thereon adapted to counteract the primary rocking couples generated by and acting on the engine.

Camshaft timing adjustment permits conversion of an engine of the type indicated from its normal power generating cycle to that of an enregy absorbing compressor thus providing variable compressive braking action on the engine and on an associated engine driven load mechanism such as a motor vehicle. Such compressive engine braking may be used separately or associated with other load braking means such as the conventional wheel brakes of a motor vehicle. With the phase adjusting servo mechanism of the above-identified S.N. 94,887 patent application, the driven phased relationship between the several balancing weights or masses are necessarily compromised, at least during periods of compressive engine braking. The invention contemplates an improved camshaft adjusting and balance weight driving arrangement which eliminates compromising of the auxiliary engine balancing means.

Although having particular application in conjunction with camshaft timing servo mechanisms for compressive engine braking purposes, the balance weight driving arrangement of the invention is not deemed to be so limited, being applicable generally to angular phase adjusting mechanisms operable to selectively adjust the phase relationship between a driven power input member and certain driven load members while maintaining the phased relationship between the input member and certain other driven load members, such as the instant phased balancing masses.

Figure 2:
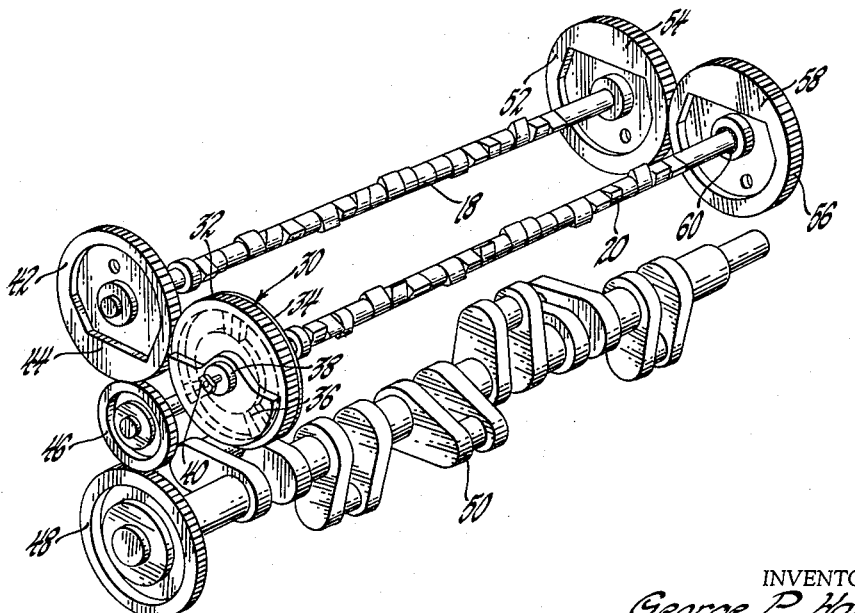

The foregoing and other objects, advantages, and features of the invention will be apparent from the following description of an illustrative embodiment, having reference to the accompanying drawings, in which:

FIGURE 1 is somewhat diagrammatic view showing a two-cycle internal combustion engine of the type indicated in plan elevational with portions thereof broken away to show the illustrative environment of the invention; and FIGURE 2 is a diagrammatic perspective view showing the camshaft adjusting and balance weight driving arrangement of the invention as applied to the crank, cam and balance shaft timing system of the two-cycle internal combustion engine of FIGURE 1.

Referring more particularly to FIGURE 1, a two-cycle uniflow scavenged V-type internal combustion engine is indicated generally by the reference numeral 10. This engine is similar to that shown and described in the above-mentioned S.N. 1,488 application. Two spaced parallel camshaft galleries 12 and 14 extend longitudinally through the engine cylinder block or frame member 16. Camshafts 18 and 20 are rotatably supported within the galleries 12 and 14, respectively, by a plurality of longitudinally spaced bearings being shown at 22, 24, 26 and 28.

A combined gear and phase adjusting servo motor 30 is mounted on the rear end of the camshaft 20. This motor assembly is preferably of a vane type similar to that shown and described in the above-mentioned S.N. 94,887 application. A vane carrying gear 32 is sealingly journaled on an inner vane carrying spider member 34 which is drivingly secured to the rear end of camshaft 20. The gear and spider members thus cooperate to define a plurality of expansible chambers between their several vanes. A balance weight 36 is mounted eccentrically on the rear face of the gear member 32 and has a central hub 38 which drivingly and reciprocably mounts a control valve 40. This control valve intersects pressure supply and venting passages and ports formed in the adjacent end of the camshaft and is adapted to regulate the supply of pressurized fluid to and from the several expansible chambers defined between the vanes carried by the gear and spider members thereby adjusting the phase relationship between the camshaft 20 and its driving gear 32.

The servo motor gear 32 is counterdriven by a gear member 42 secured on the rear end of the camshaft 18. The gear 42 has an eccentric engine balancing mass formed integrally therewith as indicated at 44. This eccentric mas is so oriented in mounting the gear 42 on the camshaft 18 that it cooperates with the counterrotating eccentric mass of the balance weight 36 to negate the primary rocking couple normally acting on or applied to the rear of the engine. The gear 42 is driven through an idler gear 46 by a timing gear 48 mounted on the rear of the engine crankshaft 50.

It will be noted that the camshaft adjusting servo motor 30 is operable to adjust only the angular phased relationship of its mounting camshaft 20 with respect to the engine crankshaft. The motor 30 is thus capable of converting only the adjacent cylinder bank or row from its normal power generating cycle to that of an energy absorbing compressive brake. The fuel controlling linkages and mechanisms of such two-cycle engines are normally associated with the engine governor and shifted to a fuel cut-off position during released throttle braking operation. Such fuel cut-off requires the inertia of the associated load device, such as a motor vehicle, to motor the engine and its associated accessories. It has been found that the single bank compressive braking load provided by the illustrative embodiment of the invention augments the normal frictional and accessory loads imposed on such a motored engine and is capable of providing braking effort on the associate load device substantially equal to the power generating capacity under normal engine cycle operation.

A combined gear and eccentric balance weight member 52 is secured to the forward end of the camshaft 18 and rotatably driven therewith. This gear may be interchangeable with the gear 42 but, as shown, is so mounted on the camshaft as to orient the eccentricity of its engine balancing mass 54 diametrically opposite that of the gear 42. A third gear and balance weight member 56 is journaled at 60 on the forward end of the camshaft 20. This journaled mounting of the gear 56 permits it to be counterdriven by the gear 52 independently of the servo motor adjusted phased relationship of the camshaft 20 with respect to the engine crankshaft 50 and the camshaft 18. Except for being journaled on its mounting camshaft, the gear member 56 is substantially the same as the gears 42 and 52, being formed from the same gear blanks. The integrally formed eccentric balancing mass 58 of the gear 56 is oriented in assembly by its driving engagement with the gear 52 so that the balancing masses 54 and 58 of the gears 52 and 56, respectively, coact to counterbalance the primary rocking couple normally applied to or acting on the front of the engine.

While the invention has been shown and described for illustrative purposes as applied to a V-engine of the type indicated, it will be apparent that it is equally applicable to any engine having similar counterrotating cam and balance shafts and auxiliary engine balancing weights and provided with camshaft adjusting means. The invention is similarly applicable to other applications wherein the driven phased relationship between several alternative load devices is similarly modified. Hence, various modifications and changes might be made from the illustrative embodiment without departing from the spirit and scope of the invention as defined in the following claims.

I claim:

1. In an internal combustion engine subject to reciprocating and rotational unbalance, an engine timing and balancing system comprising,
   an engine driven crankshaft,
   a pair of shafts journaled in parallel spaced relation,
   at least one of said shafts having a plurality of cams operable to sequentially actuate exhaust valve mechanisms associated therewith,
   first and second gears drivingly secured on opposite ends of the other of said shafts and having eccentric masses oriented in diametrically opposed phased relation,
   third and fourth gears journaled on opposite ends of said one camshaft and respectively interengaged to counterrotate said first and second gears and having diametrically opposed eccentric masses coacting with the eccentric masses of the adjacent first and second gears to counterbalance the primary rocking couples acting on the opposite ends of the engine,
   gear means for drivingly connecting one of said gears to said crankshaft thereby driving said one cam shaft in synchronous phased relation to the engine,
   and servo motor means for drivingly interconnecting one of said third and fourth gears to said one cam shaft and selectively operable to adjust the angular phased relation therebetween thereby converting the portion of the engine associated with said one camshaft from power generating engine operation to compressor cycle operation providing a desired degree or level of compressive engine and load braking power absorption independently of the phased driving relation of said gears and their eccentric masses.

2. In a two-cycle internal combustion engine, an engine timing and balancing system comprising,
   a rotatably driven crankshaft,
   a pair of cam and balance shafts journaled in parallel spaced relation to said crankshaft and rotatably operable to sequentially actuate a plurality of exhaust valve mechanisms associated therewith,
   first and second gears drivingly secured on opposite ends of one of said shafts and having eccentric masses oriented in diametrically opposed phased relation,
   gear means drivingly connecting one of said first and second gears to the engine driven crankshaft thereby driving said one cam and balance shaft in synchronous phased relation thereto,
   third and fourth gears journaled on opposite ends of the other of said cam and balance shafts and respectively interengaged with said first and second gears to counterrotate therewith,
   said third and fourth gears having eccentric masses oriented in diametrically opposed phased relation and coacting with the eccentric masses of the adjacent first and second gears to counterbalance the primary rocking couples acting on opposite ends of the engine,
   and servo motor means drivingly interconnecting one of said third and fourth gears to said other cam and balance shafts and selectively operable to adjust the angular phased relation therebetween to thereby convert at least a portion of the engine from power generating two-cycle engine operation to compressor cycle operation providing a desired degree or level of compressive engine and load braking power absorption independently of the phased relation of the engine balancing eccentric masses of said gears.

3. In a two-cycle uniflow scavenged V-type internal combustion engine having a plurality of exhaust valves and unit fuel injectors associated with each cylinder row, and engine timing and balancing system comprising,
   a pair of cam and balance shafts journaled in parallel spaced relation and rotatably operable to sequentially actuate the valve and injector mechanisms,
   first and second gears journaled on opposite ends of one of said shafts,
   third and fourth gears secured on opposite ends of the other of said shafts and respectively interengaged to counterrotate said first and second gears,
   engine driven gear means drivingly connecting one of said gears thereby driving said gears in synchronous phased relation to the engine and said gears each having an eccentric engine balancing mass oriented in diametrically opposed phased relation on opposite ends of each shaft and coacting with the eccentric mass of the adjacent gear to counterbalance the primary rocking couple acting on the adjacent end of the engine,
   and servo motor means for drivingly interconnecting one of said journaled gears to said one shaft for limited angular movement with respect thereto and selectively operable to adjust the angular phased relation therebetween to thereby convert the adjacent cylinder row of the V-engine from power generating two-cycle engine operation to compressor cycle operation thus providing compressive engine and load braking power absorption independently of the phased driving relation of said gears and the engine balancing eccentric masses thereof.

4. In an internal combustion engine, an engine timing and balancing system comprising,
   a pair of cam and balance shafts journaled in parallel spaced relation and at least one of said shafts being rotatably operable to sequentially actuate an exhaust valve mechanism associated therewith,
   first and second gears journaled on opposite ends of said one shaft,
   third and fourth gears drivingly secured on opposite ends of the other of said shafts and respectively interengaged to counterrotate said first and second gears,
   engine driven gear means for driving one of said gears in synchronous phased relation to the engine and said gears each having an engine balancing eccentric mass oriented in diametrically opposed phased relation on opposite ends of each shaft and coacting with the eccentric mass of the adjacent gear to counterbalance the primary rocking couple acting on the adjacent ends of the engine, and servo motor means for drivingly interconnecting one of said journaled gears to said one shaft for limited angular movement with respect thereto and selectively operable to adjust the angular phased relation therebetween to convert at least a portion of the engine from power generating operation to compressor operation thereby providing compressive engine and load braking power absorption independently of the phased driving relation of said gears and the engine balancing eccentric masses thereof.

5. In an internal combustion engine, an engine balancing and accessory drive system comprising, a pair of shafts journaled in parallel spaced relation, at least one of said shafts being rotatably operable to actuate an auxiliary engine mechanism associated therewith, first and second gears journaled on opposite ends of said one shaft, third and fourth gears drivingly secured on opposite ends of the other of said shafts and respectively interengaged to counterrotate said first and second gears, engine driven gear means for driving one of said gears in synchronous phased relation to the engine and said gears each having an eccentric engine balancing mass oriented in diametrically opposed phased relation on opposite ends of each shaft and coacting with the eccentric mass of the adjacent gear to counterbalance the primary rocking couples acting on opposite ends of the engine, and servo motor means for drivingly interconnecting one of said journaled gears to said one shaft and selectively operable to adjust the angular phased relation therebetween independently of the phased driving relation of said gears and their eccentric masses.

References Cited in the file of this patent

UNITED STATES PATENTS

| | | |
|---|---|---|
| 2,013,163 | Meyer | Sept. 3, 1935 |
| 2,787,987 | Portmann | Apr. 7, 1957 |
| 2,958,315 | Williams | Nov. 1, 1960 |

FOREIGN PATENTS

| | | |
|---|---|---|
| 1,011,665 | Germany | July 4, 1957 |